(12) United States Patent
Kitajima (10) Patent No.: US 8,197,131 B2
(45) Date of Patent: Jun. 12, 2012

(54) ABNORMALITY DETERMINATION APPARATUS AND ABNORMALITY DETERMINATION METHOD FOR OIL TEMPERATURE SENSOR

(75) Inventor: Kei Kitajima, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 518 days.

(21) Appl. No.: 12/504,704

(22) Filed: Jul. 17, 2009

(65) Prior Publication Data

US 2010/0195693 A1 Aug. 5, 2010

(30) Foreign Application Priority Data

Feb. 4, 2009 (JP) ................................ 2009-023745

(51) Int. Cl.
*G01B 7/00* (2006.01)
*G01K 7/00* (2006.01)
*G01F 11/00* (2006.01)

(52) U.S. Cl. .......... 374/141; 374/29; 374/144; 374/163; 374/57; 702/182; 702/99; 701/34

(58) Field of Classification Search .................. 702/182, 702/183, 185, FOR. 138, FOR. 142, 99, 130; 374/100, 141, 1, 42, 144, 152, 163, 183, 374/166, 137, 29, 208, 4, 5, 45, 110, 112, 374/115, 101, 102, 148, 57; 73/114, 68, 73/114.77, 766; 123/41.01, 41.05, 41.12, 123/41.13, 41.15, 350, 359, 378; 701/34, 701/97, 62, 29; 165/42, 58, FOR. 101; 324/713, 324/718, FOR. 104, 378, 500, 754.01

See application file for complete search history.

(56) References Cited

U.S. PATENT DOCUMENTS

| | | | | | |
|---|---|---|---|---|---|
| 5,282,386 | A | * | 2/1994 | Niemczyk et al. | 73/292 |
| 5,319,963 | A | * | 6/1994 | Benford | 73/115.02 |
| 5,995,887 | A | * | 11/1999 | Hathaway et al. | 701/30.1 |
| 6,022,139 | A | * | 2/2000 | Kil | 374/142 |
| 7,445,383 | B2 | * | 11/2008 | Huttenlocher et al. | 374/137 |
| 8,042,998 | B2 | * | 10/2011 | Choi et al. | 374/144 |
| 2006/0149441 | A1 | | 7/2006 | Takamura | |
| 2006/0185626 | A1 | * | 8/2006 | Allen et al. | 123/41.12 |

FOREIGN PATENT DOCUMENTS

| | | |
|---|---|---|
| JP | 5-272622 | 10/1993 |
| JP | 8-303564 | 11/1996 |
| JP | 2004-340172 | 12/2004 |

OTHER PUBLICATIONS

Extended European Search Report for EP Appl. No. 09162238.1 dated Jun. 23, 2010.

* cited by examiner

*Primary Examiner* — Gail Verbitsky
(74) *Attorney, Agent, or Firm* — Finnegan, Henderson, Farabow, Garrett & Dunner, LLP (57) ABSTRACT

Until the accuracy in calculation of an estimated oil temperature value which is calculated by means of a heat dissipation amount map reaches a predetermined level, an ECU determines, when a transmission oil temperature well exceeds a predetermined temperature after the engine start, whether or not an oil temperature sensor fails. When it is determined that the oil temperature sensor is normal, the ECU uses the detected oil temperature value to learn about the heat dissipation map. When the accuracy in calculation of the estimated oil temperature value reaches the predetermined level through the learning about the heat dissipation amount map, the ECU determines whether or not the oil temperature sensor fails based on the divergence of the detected oil temperature value relative to the estimated oil temperature value.

6 Claims, 5 Drawing Sheets

ABNORMALITY DETERMINATION APPARATUS AND ABNORMALITY DETERMINATION METHOD FOR OIL TEMPERATURE SENSOR

This nonprovisional application is based on Japanese Patent Application No. 2009-023745 filed on Feb. 4, 2009 with the Japan Patent Office, the entire contents of which are hereby incorporated by reference.

BACKGROUND OF THE INVENTION

1. Field of the Invention

The present invention relates to a technique of determining whether or not an abnormality occurs to an oil temperature sensor used for detecting the temperature of a transmission oil of an automatic transmission for a vehicle.

2. Description of the Background Art

An automatic transmission for a vehicle is generally controlled by means of a transmission oil supplied from an oil hydraulic control circuit. The transmission oil is a fluid whose characteristic such as viscosity varies according to the temperature. It is therefore desirable to keep the oil temperature at an appropriate temperature in order to achieve a stable transmission feeling. If an abnormality occurs to an oil temperature sensor used for detecting the temperature of the transmission oil supplied to the automatic transmission, the transmission performance and the durability could be deteriorated. Thus, whether or not such an abnormality occurs should be determined as early as possible. Japanese Patent Laying-Open No. 2004-340172 for example discloses how to determine whether or not an oil temperature sensor is abnormal.

An oil temperature determination apparatus disclosed in Japanese Patent Laying-Open No. 2004-340172 detects the transmission response time of an automatic transmission, and calculates an estimate value of the transmission oil temperature based on the detected transmission response time. In the case where a temperature difference between the oil temperature detected by the oil temperature sensor and the estimate value of the oil temperature is equal to or larger than a predetermined value, the oil temperature determination apparatus determines that the oil temperature sensor is abnormal.

Further, Japanese Patent Laying-Open Nos. 08-303564 and 05-272622 each disclose how to estimate the temperature of the oil for an automatic transmission.

The oil temperature estimation apparatus disclosed in Japanese Patent Laying-Open No. 08-303564 estimates the amount of heat generated from the automatic transmission based on operating conditions of the automatic transmission, estimates the amount of heat dissipated into the atmosphere based on the vehicle speed and the ambient temperature of the automatic transmission, and estimates the temperature of the oil for the automatic transmission based on the estimated amount of the generated heat and the estimated amount of the dissipated heat.

The oil temperature estimation apparatus disclosed in Japanese Patent Laying-Open No. 05-272622 calculates the capacity coefficient of a torque converter from the engine speed and the engine output torque, calculates the speed ratio of the torque converter from the engine speed and the turbine speed, and estimates the temperature of the oil for the automatic transmission based on the capacity coefficient and the speed ratio of the torque converter.

While the oil temperature determination apparatus disclosed in Japanese Patent Laying-Open No. 2004-340172 calculates the estimate value of the oil temperature based on the transmission response time, the relation between the transmission response time and the temperature of the transmission oil varies depending on individual transmission units. In order to ensure the accuracy in estimation of the oil temperature, it is necessary to adapt in advance the relation between the transmission response time and the temperature of the transmission oil to each transmission unit. In this case, enormous work time is required for the adaptation.

As for the oil temperature determination apparatus disclosed in Japanese Patent Laying-Open No. 08-303564, the amount of heat dissipated into the atmosphere is estimated based on the vehicle speed and the ambient temperature of the automatic transmission. The relation between the transmission response time and the temperature of the transmission oil, as well as the relation between (i) the vehicle speed and the ambient temperature of the automatic transmission and (ii) the amount of heat dissipated into the atmosphere vary depending on individual transmission units and depending on individual vehicles where respective transmissions are mounted. In order to ensure the accuracy in estimation of the oil temperature, it is therefore necessary to adapt the relation between the transmission response time and the temperature of the transmission oil, as well as the relation between (i) the vehicle speed and the ambient temperature of the automatic transmission and (ii) the amount of heat dissipated into the atmosphere, to each transmission unit and each vehicle on which the transmission is mounted, which requires enormous work time for adaptation.

Further, the oil temperature estimation apparatus disclosed in Japanese Patent Laying-Open No. 05-272622 does not consider the amount of dissipated heat in estimating the temperature of oil for the automatic transmission. Therefore, in order to ensure the accuracy in estimation of the oil temperature, further improvements are necessary.

SUMMARY OF THE INVENTION

The present invention has been made to solve the above-described problems. An object of the invention is to provide an abnormality determination apparatus and an abnormality determination method for an oil temperature sensor that can precisely estimate the temperature of the transmission oil for the transmission while reducing the work time required for adaptation.

According to an aspect of the present invention, an abnormality determination apparatus for an oil temperature sensor is provided. The oil temperature sensor is used for detecting a temperature of a transmission oil of a transmission for a vehicle, and the transmission is used for changing a rotational speed of a drive power source. The abnormality determination apparatus includes: the oil temperature sensor; a first detection unit for detecting a vehicle state amount correlating with heat generation of the transmission; a second detection unit for detecting a vehicle state amount correlating with heat dissipation of the transmission oil; and a control unit connected to the oil temperature sensor, the first detection unit and the second detection unit. The control unit includes: a first determination unit for performing a first determination process of determining whether or not the oil temperature sensor is abnormal, based on a result of comparison between a detected temperature detected by the oil temperature sensor and a predetermined temperature; a learning unit for learning about a correlation between a first heat dissipation amount of the transmission oil and the vehicle state amount correlating with heat dissipation when it is determined in the first determination process that the oil temperature sensor is normal, the learning unit calculating, when it is determined in the first determination process that the oil temperature sensor is normal, a heat generation amount of the transmission based on the vehicle state amount correlating with heat generation, and calculating the first heat dissipation amount based on the heat generation amount and the detected temperature; and an estimation unit for estimating a temperature of the transmission oil based on the heat generation amount and a second heat dissipation amount corresponding to the vehicle state amount correlating with heat dissipation, the estimation unit calculating the heat generation amount based on the vehicle state amount correlating with heat generation, and calculating the second heat dissipation amount using a result of learning by the learning unit.

Preferably, each time it is determined in the first determination process that the oil temperature sensor is normal, the learning unit learns about the correlation between the first heat dissipation amount and the vehicle state amount correlating with heat dissipation, and stores, in a form of a heat dissipation map, a plurality of correlations between respective first heat dissipation amounts and respective vehicle state amounts correlating with heat dissipation obtained each time the learning is performed. The estimation unit calculates the second heat dissipation amount with reference to the heat dissipation map.

Preferably, the vehicle state amount correlating with heat generation includes at least one of an operational history of the drive power source, an operational history of the transmission and a travel distance of the vehicle. The vehicle state amount correlating with heat dissipation includes at least one of a travel speed history of the vehicle and an outside air temperature history of the vehicle.

Preferably, the abnormality determination apparatus further includes an accuracy determination unit for determining, based on a difference between the detected temperature and an estimated temperature of the transmission oil estimated by the estimation unit, whether or not an accuracy of the estimated temperature reaches a predetermined target accuracy. The first determination unit performs the first determination process in a case where the accuracy of the estimated temperature is lower than the predetermined target accuracy. The abnormality determination apparatus further includes a second determination unit for performing a second determination process of determining whether or not the oil temperature sensor is abnormal, based on the difference between the estimated temperature and the detected temperature, in a case where the accuracy of the estimated temperature reaches the predetermined target accuracy.

More preferably, in a case where the accuracy of the estimated temperature is lower than the predetermined target accuracy, the first determination unit determines whether or not the vehicle state amount correlating with heat generation of the transmission reaches a predetermined amount from which it is predicted that the temperature of the transmission oil increases to a temperature higher than the predetermined temperature, and performs the first determination process after it is determined that the vehicle state amount correlating with heat generation of the transmission reaches the predetermined amount. In a case where the accuracy of the estimated temperature reaches the predetermined target accuracy, the second determination unit performs the second determination process, regardless of whether or not the vehicle state amount correlating with heat generation of the transmission reaches the predetermined amount.

According to another aspect of the present invention, an abnormality determination method is performed by an abnormality determination apparatus for an oil temperature sensor used for detecting a temperature of a transmission oil of a transmission for a vehicle used for changing a rotational speed of a drive power source. The abnormality determination apparatus is connected to the oil temperature sensor, a first detection unit for detecting a vehicle state amount correlating with heat generation of the transmission, and a second detection unit for detecting a vehicle state amount correlating with heat dissipation of the transmission oil. The abnormality determination method includes the steps of: performing a first determination process of determining whether or not the oil temperature sensor is abnormal, based on a result of comparison between a detected temperature detected by the oil temperature sensor and a predetermined temperature; learning about a correlation between a first heat dissipation amount of the transmission oil and the vehicle state amount correlating with heat dissipation when it is determined in the first determination process that the oil temperature sensor is normal, the step of learning including calculating, when it is determined in the first determination process that the oil temperature sensor is normal, a heat generation amount of the transmission based on the vehicle state amount correlating with heat generation, and calculating the first heat dissipation amount based on the heat generation amount and the detected temperature; estimating a temperature of the transmission oil based on the heat generation amount and a second heat dissipation amount corresponding to the vehicle state amount correlating with heat dissipation, the step of estimating including calculating the heat generation amount based on the vehicle state amount correlating with heat generation, and calculating the second heat dissipation amount using a result of learning in the step of learning, determining, based on a difference between the detected temperature detected by the oil temperature sensor and an estimated temperature of the transmission oil estimated in the step of estimating the temperature of the transmission oil, whether or not an accuracy of the estimated temperature reaches a predetermined target accuracy; and performing, in a case where the accuracy of the estimated temperature reaches the predetermined target accuracy, a second determination process of determining whether or not the oil temperature sensor is abnormal, instead of the first determination process, based on the difference between the estimated temperature and the detected temperature detected by the oil temperature sensor.

A chief advantage of the present invention is therefore that the temperature of the transmission oil for the transmission can be precisely estimated while the work time for adaptation is reduced.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention will be described hereinafter with reference to the drawings. In the following description, like components are denoted by like reference characters. These components are named identically and function identically. Therefore, a detailed description thereof will not be repeated.

Figure 1:
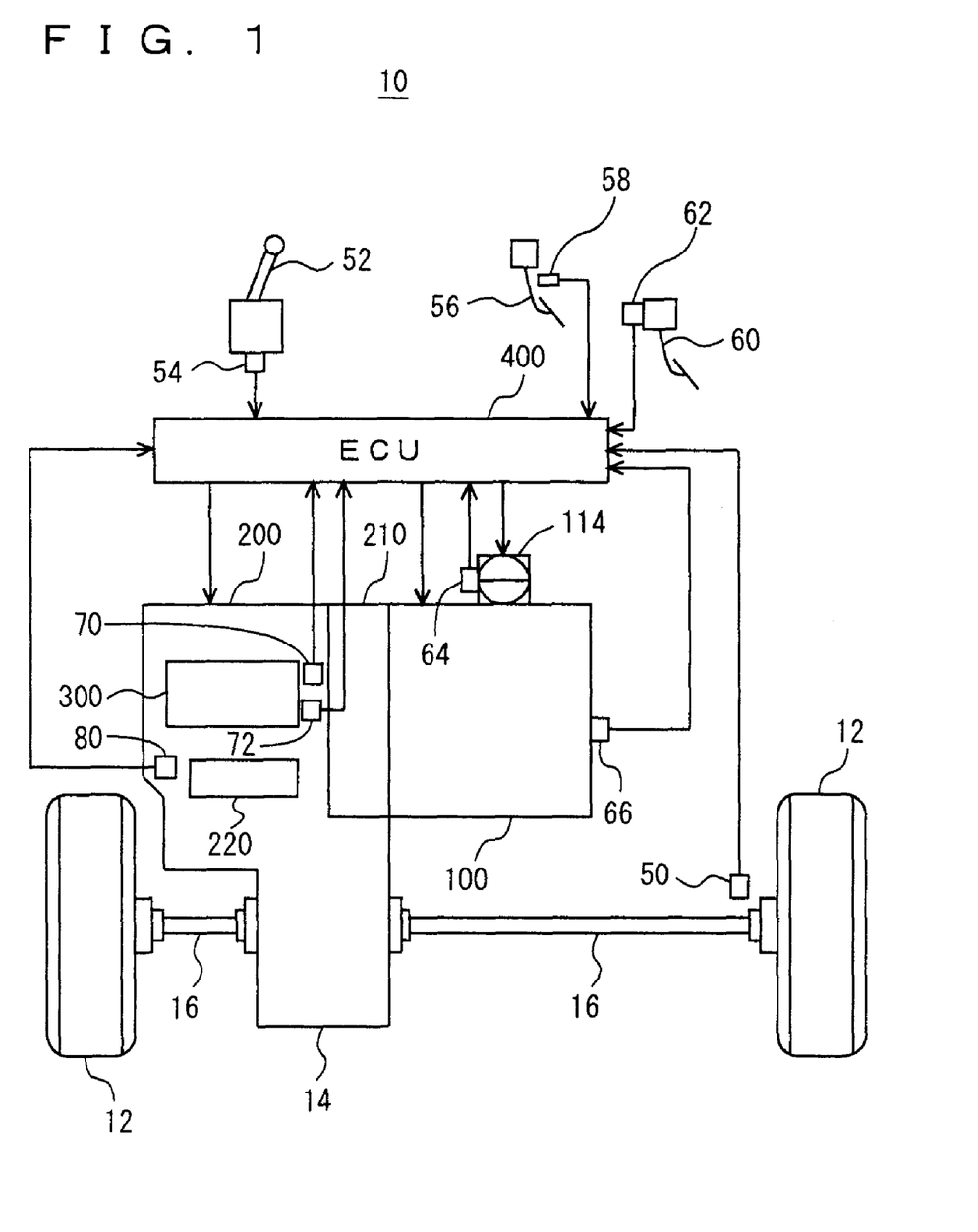
FIG. 1 is a diagram showing a configuration of a vehicle mounted with an abnormality determination apparatus for an oil temperature sensor according to an embodiment.

Referring to FIG. 1, a description will be given of a vehicle 10 mounted with an abnormality determination apparatus for an oil temperature sensor according to an embodiment of the present invention. Vehicle 10 is an FF (Front-engine Front-drive) vehicle. Vehicle 10 may be any vehicle other than the FF vehicle.

Vehicle 10 includes an engine 100, a torque converter 210, an automatic transmission 200, drive wheels 12, a differential gear 14, a driveshaft 16, and an ECU (Electronic Control Unit) 400.

Engine 100 is an internal combustion engine in which a mixture of fuel injected from an injector (not shown) and air is burned in a combustion chamber of a cylinder. The burning of the air-fuel mixture causes a piston in the cylinder to be pressed down to rotate a crankshaft.

Automatic transmission 200 is coupled via torque converter 210 to engine 100. Automatic transmission 200 includes a planetary gear unit 300 having a plurality of frictional engagement elements (clutch and brake) for changing the gear ratio, and an oil hydraulic circuit 220 for controlling the operating state of each frictional engagement element. According to a command to change the gear ratio from ECU 400, oil hydraulic circuit 220 controls the pressure of a transmission oil (Automatic Transmission Fluid, hereinafter also simply referred to as "ATF") supplied to each frictional engagement element. Accordingly, automatic transmission 200 implements a desired gear ratio to change the rotational speed of the crankshaft to a desired rotational speed.

ATF is circulated in automatic transmission 200 and also supplied to torque converter 210. The heat generated from automatic transmission 200 and torque converter 210 is transmitted to ATF. ATF is circulated between automatic transmission 200 and an oil cooler (not shown) and thus also serves as a cooling oil for automatic transmission 200.

An output gear of automatic transmission 200 meshes with differential gear 14. To differential gear 14, driveshaft 16 is coupled by spline fitting or the like. Motive power is transmitted via driveshaft 16 to right and left drive wheels 12.

To ECU 400, respective signals from a vehicle speed sensor 50, a position switch 54, an accelerator pedal position sensor 58, a stroke sensor 62, a throttle position sensor 64, an engine speed sensor 66, an input shaft rotational speed sensor 70, an output shaft rotational speed sensor 72, and an oil temperature sensor 80 are input.

Vehicle speed sensor 50 detects speed V of vehicle 10 from the rotational speed of driveshaft 16. Position switch 54 detects position (shift position) SP of a shift lever 52. Accelerator pedal position sensor 58 detects the extent to which an accelerator pedal 56 is operated (accelerator pedal position) ACC. Stroke sensor 62 detects stroke amount (brake stroke amount) BS of a brake pedal 60. Throttle position sensor 64 detects the operational amount (throttle position) of an electronic throttle valve 114. Engine speed sensor 66 detects rotational speed (engine speed) NE of the output shaft (crankshaft) of engine 100. Input shaft rotational speed sensor 70 detects rotational speed NIN of an input shaft of automatic transmission 200. Output shaft rotational speed sensor 72 detects rotational speed NOUT of an output shaft of automatic transmission 200. Oil temperature sensor 80 detects temperature THO of ATF. In the following description, temperature THO of ATF detected by oil temperature sensor 80 is also referred to as detected oil temperature value THOde.

ECU 400 controls equipment of the vehicle based on respective signals sent from sensors as well as a map and a program for example stored in a ROM (Read-Only Memory), so that vehicle 10 travels in a desired condition.

Figure 2:
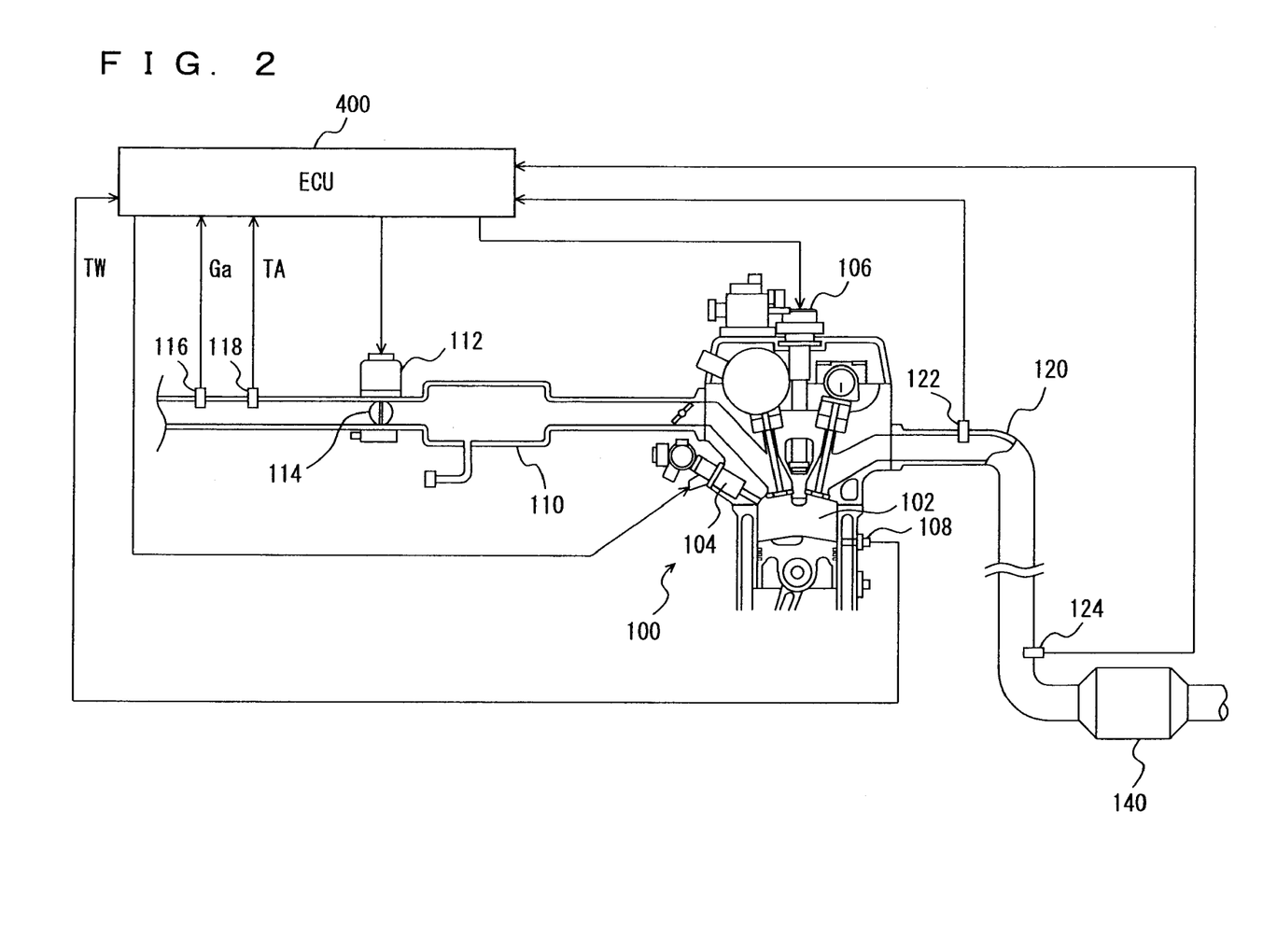
FIG. 2 is a diagram showing an engine and peripheral equipment associated with the engine.

Referring to FIG. 2, engine 100 and peripheral equipment associated with engine 100 will be described. In engine 100, the air taken from an air cleaner (not shown) flows through an intake pipe 110 to be introduced into a combustion chamber 102 of engine 100. The throttle position is used to adjust the amount of air introduced into combustion chamber 102. The throttle position is controlled by a throttle motor 112 operated based on a signal from ECU 400.

Fuel is stored in a fuel tank (not shown), and injected by means of a fuel pump (not shown) from an injector 104 into combustion chamber 102. The air-fuel mixture, namely a mixture of the air taken from intake pipe 10 and the fuel injected from injector 104, is ignited and burned by means of an ignition coil 106 controlled based on a control signal from ECU 400. Exhaust gas generated as a result of the burning of the air-fuel mixture is purified by a catalyst 140 provided at a location along an exhaust pipe 120 to be discharged into the atmosphere.

To ECU 400, respective signals from an engine coolant temperature sensor 108, an airflow meter 116, an intake air temperature sensor 118, an air-fuel ratio sensor 122, and an oxygen sensor 124 are input. Engine coolant temperature sensor 108 detects temperature THW of the coolant for engine 100 (engine coolant temperature). Airflow meter 116 detects the amount of air (the amount of intake air) Ga per unit time that is taken into engine 100. Intake air temperature sensor 118 detects the temperature of air (temperature of intake air) THA that is taken into engine 100. Air-fuel ratio sensor 122 detects the ratio between the air and the fuel in the exhaust gas. Oxygen sensor 124 detects the concentration of oxygen in the exhaust gas.

Based on the signals from respective sensors, ECU 400 controls ignition coil 106 so that ignition occurs at an appropriate timing, controls throttle motor 112 so that the throttle position is an appropriate position, and controls injector 104 so that an appropriate amount of fuel is injected.

In the vehicle configured in the above-described manner, automatic transmission 200 is controlled by means of ATF supplied from oil hydraulic circuit 220. ATF is a fluid whose characteristic such as viscosity varies depending on the temperature. It is therefore desirable to keep the temperature of ATF at an appropriate temperature in order to achieve a stable transmission feeling. In the case where an abnormality occurs to oil temperature sensor 80 used for detecting the temperature of ATF, the transmission performance and durability could be deteriorated. Therefore, whether or not an abnormality occurs to oil temperature sensor 80 should be determined as early as possible.

Accordingly, ECU 400 in the present embodiment performs one of a first abnormality determination process and a second abnormality determination process to determine whether or not an abnormality occurs to oil temperature sensor 80 (fail determination).

In the first abnormality determination process, ECU 400 determines whether or not temperature THO of ATF well exceeds predetermined temperature T0, based on a parameter, specifically a vehicle state amount that has a close relation with a temperature increase of ATF. After determining that temperature THO of ATF well exceeds predetermined temperature T0, ECU 400 compares detected oil temperature value THOde with predetermined temperature T0, and determines whether or not oil temperature sensor 80 is abnormal, based on the result of the comparison. Here, predetermined temperature T0 is set to a value with which an increase of the temperature of ATF after engine 100 is started can be identified, and which is between the temperature of ATF immediately before engine 100 is started (in the case where engine 100 has been stopped for a sufficiently long period of time, this temperature is approximately equal to the outside air temperature) and the upper limit temperature of ATF after engine 100 is started.

In the first abnormality determination process, whether or not oil temperature sensor 80 is abnormal can be determined using the simple technique of comparing detected oil temperature value THOde with predetermined temperature T0. Before the state where temperature THO of ATF well exceeds predetermined temperature T0 is reached, however, the determination itself as to an abnormality of oil temperature sensor 80 cannot be done. Thus, there is a relatively long period of time (approximately several tens of minutes for example) between the time when engine 100 is started and the time when the result of determination about an abnormality of oil temperature sensor 80 is obtained (the period of time is hereinafter also referred to simply as "fail determination time").

In contrast, in the second abnormality determination process, ECU 400 calculates estimated oil temperature value THOes, and monitors the divergence of detected oil temperature value THOde from estimated oil temperature value THOes to determine whether or not an oil temperature sensor 80 is abnormal.

In the second abnormality determination process, whether or not oil temperature sensor 80 is abnormal can be determined even before ATF exceeds predetermined temperature T0, so that the fail determination time can be considerably shortened as compared with the first abnormality determination process. In the second abnormality determination process, however, whether or not oil temperature sensor 80 is abnormal is determined based on estimated oil temperature value THOes, and thus the determination could be in error if the accuracy in calculation of estimated oil temperature value THOes (oil temperature estimation accuracy) is low.

Accordingly, during an initial trip (trip: a period from the start to the stop of engine 100) after the vehicle is completed, ECU 400 in the present embodiment performs the first abnormality determination process as well as a process for improving the accuracy in calculation of estimated oil temperature value THOes (the process refers to learning of a heat dissipation characteristic of the vehicle as described hereinlater). Then, ECU 400 verifies the accuracy in calculation of estimated oil temperature value THOes and, during the trips after the accuracy in calculation of estimated oil temperature value THOes reaches a predetermined level, ECU 400 performs the second abnormality determination process instead of the first abnormality determination process.

Figure 3:
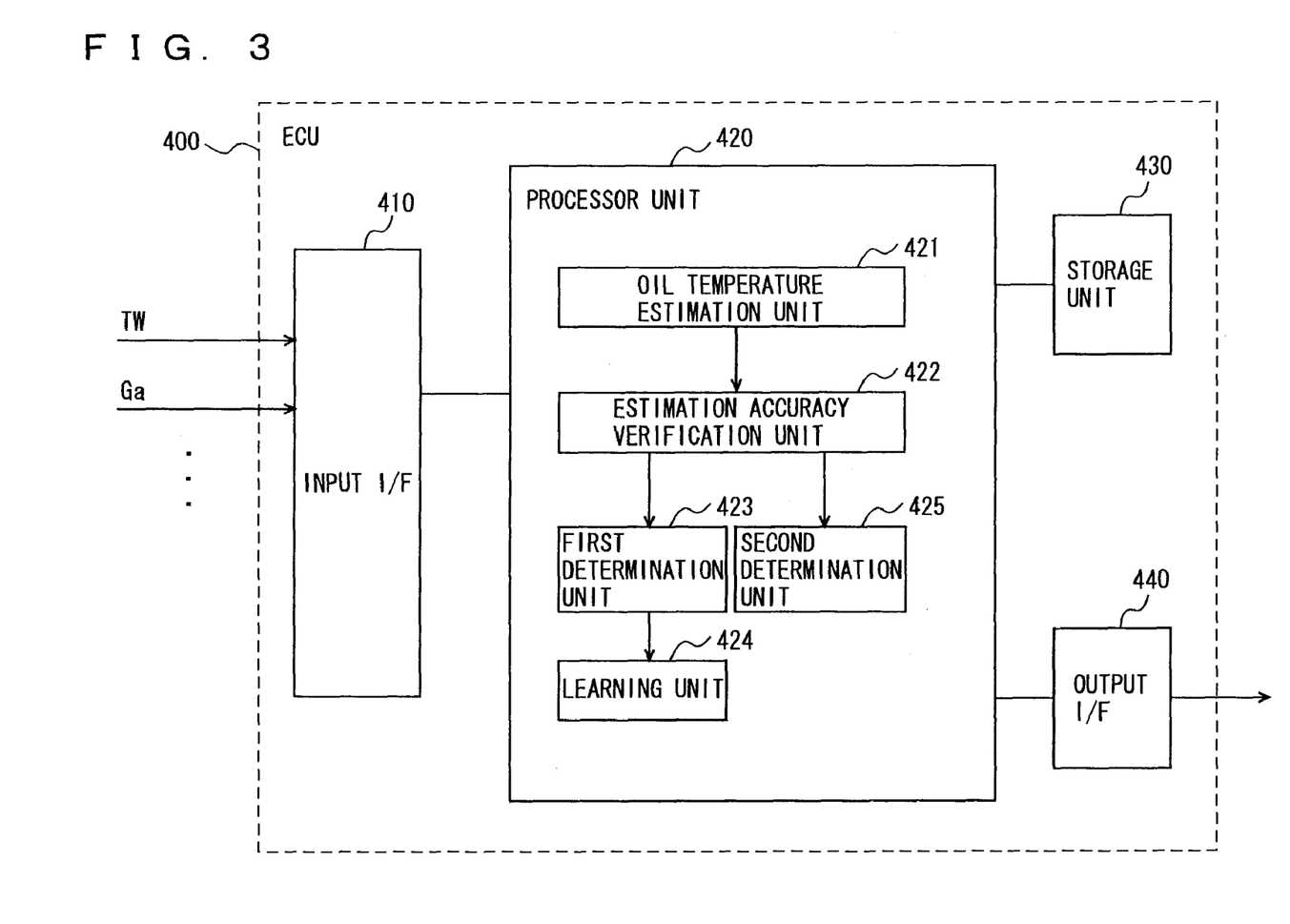
FIG. 3 is a functional block diagram of an ECU.

Referring to FIG. 3, the abnormality determination process for oil temperature sensor 80 performed by ECU 400 will be described in more detail. FIG. 3 is a functional block diagram of ECU 400 when performing the abnormality determination process for oil temperature sensor 80.

ECU 400 includes an input interface 410 receiving information from each sensor or like component, a storage unit 430 where various information, program, threshold, map for example are stored and where data is read from a processor unit 420 or data from processor unit 420 is stored as required, processor unit 420 performing an operational process based on information from input interface 410 and storage unit 430, and an output interface 440 outputting the result of the process performed by processor unit 420.

Processor unit 420 includes an oil temperature estimation unit 421, an estimation accuracy verification unit 422, a first determination unit 423, a learning unit 424, and a second determination unit 425

Oil temperature estimation unit 421 calculates heat generation amount Q representing an amount of heat generated through operation of engine 100 and automatic transmission 200, and heat dissipation amount Qout representing an amount of heat that is a part of heat generation amount Q and that has not been absorbed by ATF to be discharged to the outside, and calculates estimated oil temperature value THOes based on calculated heat generation amount Q and heat dissipation amount Qout.

More specifically, oil temperature estimation unit 421 first detects a vehicle state amount that has a close relation with heat generation amount Q, based on for example information from each sensor, and then calculates heat generation amount Q of automatic transmission 200 using the detected vehicle state amount as a parameter. As the vehicle state amount having a close relation with heat generation amount Q, an operational history of engine 100 or automatic transmission 200 during one trip for example may be used. Respective operational histories can be detected or calculated based on, for example, information from existing sensors such as accelerator pedal position sensor 58, throttle position sensor 64, engine speed sensor 66, input shaft rotational speed sensor 70, output shaft rotational speed sensor 72, and engine coolant temperature sensor 108.

Next, oil temperature estimation unit 421 detects another vehicle state amount that has a close relation with the heat dissipation characteristic of ATF, based on for example information from each sensor, and then calculates heat dissipation amount Qout corresponding to the detected vehicle state amount, using a heat dissipation amount map. In the heat dissipation amount map, a correlation between a vehicle state amount having a close relation with the heat dissipation characteristic of ATF and heat dissipation amount Qout is modeled in advance, and the map is stored in advance in storage unit 430. Since the heat dissipation characteristic (amount of dissipated heat) of ATF varies depending on factors such as the amount of wind blowing against automatic transmission 200 and the oil cooler as well as the external air temperature, the present embodiment uses, as a vehicle state amount having a close relation with the heat dissipation characteristic of ATF, average Vave of vehicle speed V detected by vehicle speed sensor 50 (corresponding to the amount of wind) and average THAave of intake air temperature THA detected by intake air temperature sensor 118 (corresponding to the external air temperature). The data in the heat dissipation amount map is updated successively according to the results of learning by learning unit 424 as described hereinlater.

Then, oil temperature estimation unit 421 calculates, based on the balance between the amounts of heat, a difference between heat generation amount Q and heat dissipation amount Qout. The calculated difference is regarded as an amount of heat absorbed by ATF (hereinafter referred to as "heat absorption amount Qin"). The calculated heat absorption amount Qin is used as a parameter to determine an increase of the temperature of ATF with respect to the temperature when the engine is started, and accordingly estimated oil temperature value THOes is calculated.

As seen from above, heat generation amount Q and heat dissipation amount Qout are used for calculating estimated oil temperature value THOes by oil temperature estimation unit 421. Here, since basically heat generation amount Q is determined uniquely from the operational history of engine 100 or automatic transmission 200, the accuracy in calculation of heat generation amount Q is relatively high. The accuracy in calculation of heat dissipation amount Qout, however, is not necessarily high for the following reason. The heat dissipation characteristic of ATF varies depending on not only vehicle speed V (average vehicle speed Vave) or the like but any factor that varies depending on individual vehicles, such as the shape of automatic transmission 200 that influences the amount of wind, the locations of the vehicle where automatic transmission 200 and the oil cooler are mounted. It is difficult to prepare a heat dissipation amount map in which the correlations between all of the factors of the variation and heat dissipation amount Qout are modeled in advance.

Accordingly, in the present embodiment, estimation accuracy verification unit 422 verifies the accuracy in calculation of estimated oil temperature value THOes. Estimation accuracy verification unit 422 monitors a difference ΔTHO between detected oil temperature value THOde and estimated oil temperature value THOes as a divergence of detected oil temperature value THOde relative to estimated oil temperature value THOes, and verifies the accuracy in calculation of estimated oil temperature value THOes based on difference ΔTHO.

In the case where difference ΔTHO continues smaller than a predetermined value for predetermined time t0, estimation accuracy verification unit 422 determines that the accuracy in calculation of estimated oil temperature value THOes reaches a predetermined level, and sets a change flag to "ON." Otherwise, estimation accuracy verification unit 422 determines that the accuracy in calculation of estimated oil temperature value THOes has not reached the predetermined level, and sets the change flag to "OFF." The change flag is stored in storage unit 430, and set to "OFF" in the initial state. Therefore, until the accuracy in calculation of estimated oil temperature value THOes reaches the predetermined level (for example, from the first trip to an n-th trip ("n" represents several times to several tens of times), the change flag is set to "OFF." After the accuracy in calculation of estimated oil temperature value THOes reaches the predetermined level through repeated learning of the heat dissipation amount map by learning unit 424 as described hereinlater, the change flag is set to "ON."

First determination unit 423 performs the above-described first abnormality determination process when the change flag is "OFF" (namely the accuracy in calculation of estimated oil temperature value THOes has not reached the predetermined level).

Specifically, first determination unit 423 determines whether or not temperature THO of ATF well exceeds predetermined temperature T0, using as a parameter a vehicle state amount having a close relation with a temperature increase of ATF. After determining that temperature THO of ATF sufficiently exceeds predetermined temperature T0, first determination unit 423 compares detected oil temperature value THOde with predetermined temperature T0, and determines whether or not oil temperature sensor 80 is abnormal based on the result of the comparison. In the following description, a case will be illustrated where the cumulative drive time in one trip (the total time during which engine 100 generates drive power for accelerating vehicle 10), the travel distance in one trip, and the elapsed time from the start of engine 100 are used as vehicle state amounts having a close relation with a temperature increase of ATF. When the cumulative drive time in one trip exceeds predetermined time t1 and the travel distance in one trip exceeds a predetermined distance and the elapsed time from the start of engine 100 exceeds predetermined time t2, first determination unit 423 determines that temperature THO of ATF well exceeds predetermined temperature T0 and compares detected oil temperature value THOde with predetermined temperature T0 at this time and, based on the result of the comparison, determines whether or not oil temperature sensor 80 is abnormal.

Learning unit 424 learns about the heat dissipation amount map each time it is determined through the first abnormality determination process that oil temperature sensor 80 is normal. Learning unit 424 calculates heat absorption amount Qin using, as a parameter, detected oil temperature value THOde (increase) at the time when it is determined that oil temperature sensor 80 is normal through the first abnormality determination process, and calculates heat generation amount Q using, as a parameter, a vehicle state amount having a close relation with heat generation amount Q, like above-described oil temperature estimation unit 421. Learning unit 424 then calculates heat dissipation amount Qout from a difference between heat generation amount Q and heat absorption amount Qin, correlates the calculated heat dissipation amount Qout with vehicle speed V (average vehicle speed Vave) and intake air temperature THA (average intake air temperature THAave) at the time when it is determined that oil temperature sensor 80 is normal in the first abnormality determination process, and stores the correlated elements in the heat dissipation amount map.

In other words, only when the accuracy in detection of oil temperature value THOde is high, learning unit 424 calculates heat dissipation amount Qout based on detected oil temperature value THOde. Heat dissipation amount Qout is thus calculated with high accuracy. Learning unit 424 then updates the heat dissipation map using, as parameters, calculated heat dissipation amount Qout, as well as actually detected vehicle speed V (average vehicle speed Vave) and intake air temperature THA (average intake air temperature THAave). As the update of the heat dissipation amount map is repeated, the accuracy of the heat dissipation amount map (accuracy of the correlation between heat dissipation amount Qout and average vehicle speed Vave and average intake air temperature THAave) is improved. Therefore, the accuracy in calculation of estimated oil temperature value THOes by oil temperature estimation unit 421 by means of the heat dissipation amount map is also improved.

Second determination unit 425 performs the above-described second abnormality determination process when the change flag is "ON" (namely the accuracy in calculation of estimated oil temperature value THOes reaches a predetermined level).

Specifically, second determination unit 425 monitors difference ΔTHO between detected oil temperature value THOde and estimated oil temperature value THOes, as a divergence of detected oil temperature value THOde relative to estimated oil temperature value THOes as calculated by oil temperature estimation unit 421, and determines whether or not oil temperature sensor 80 is abnormal, based on whether or not difference ΔTHO continues smaller than a predetermined value for predetermined time t0.

In other words, until the accuracy in calculation of estimated oil temperature value THOes reaches a predetermined level, ECU 400 determines whether or not oil temperature sensor 80 is abnormal in the first abnormality determination process and repeats learning about the heat dissipation amount map. Then, after the repeated learning about the heat dissipation amount map causes the accuracy in calculation of estimated oil temperature value THOes to reach the predetermined level, ECU 400 determines whether or not oil temperature sensor 80 is abnormal in the second abnormality determination process.

The above-described functions may be implemented by software or may be implemented by hardware.

Figure 4:
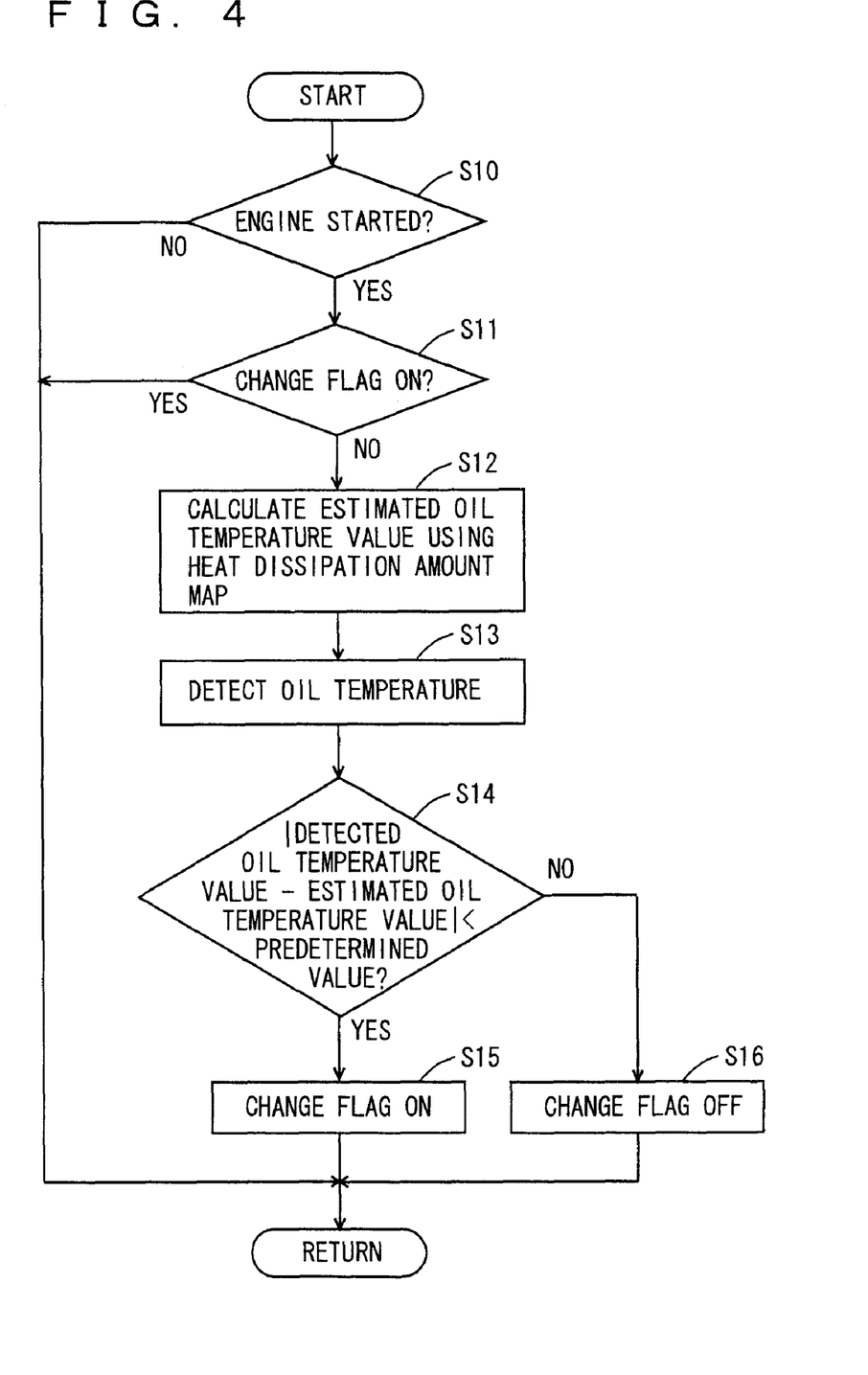
FIG. 4 shows a first process flow of the ECU.
Figure 5:
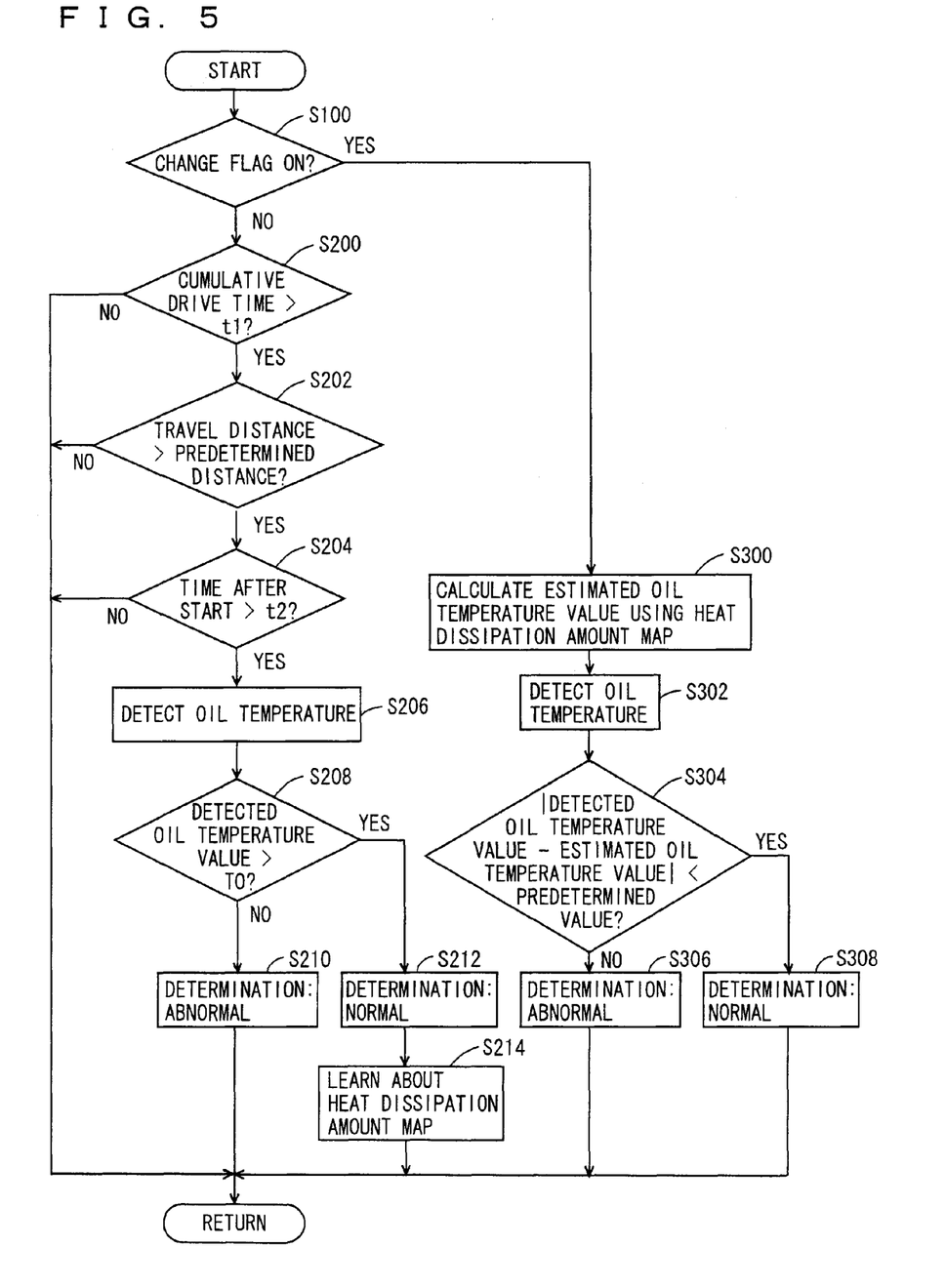
FIG. 5 shows a second process flow of the ECU.

FIGS. 4 and 5 each show a process flow of ECU 400 in the case where the above-described functions are implemented by software.

FIG. 4 shows a process flow of ECU 400 when the above-described change flag is to be set. The process flow is repeated in predetermined cycles.

As shown in FIG. 4, in step ("step" is hereinafter abbreviated as "S") 10, ECU 400 determines whether or not engine 100 is started. When the determination is positive (YES in S10), the process proceeds to S11. Otherwise (NO in S10), the process is ended.

In S11, ECU 400 determines whether or not the change flag is "ON." In the initial state, the change flag is set to "OFF" and stored in storage unit 430 as described above, and the change flag is set to "ON" or "OFF" in S14 or S15 described hereinlater. When the determination is positive (YES in S11), the process proceeds to S12. Otherwise (NO in S11), the process is ended.

In S12, ECU 400 calculates estimated oil temperature value THOes using the heat dissipation amount map. Namely, ECU 400 calculates heat generation amount Q based on an operational history of engine 100 or automatic transmission 200 during the present trip, detects average vehicle speed Vave and average intake air temperature THAave during the present trip, and calculates heat dissipation amount Qout corresponding to the result of detection with reference to the heat dissipation amount map. Then, ECU 400 calculates heat absorption amount Qin from a difference between heat generation amount Q and heat dissipation amount Qout, and calculates estimated oil temperature value THOes using the calculated heat absorption amount Qin as a parameter. Since the heat dissipation amount map has been described above, the description thereof will not be repeated here.

In S13, ECU 400 detects oil temperature value THOde. In S14, ECU 400 determines whether or not difference ΔTHO between detected oil temperature value THOde and estimated oil temperature value THOes continues smaller than a predetermined value for predetermined time t0. When the determination is positive (YES in S14), it is determined that the accuracy in calculation of estimated oil temperature value THOes has reached a predetermined level, and the process proceeds to S15. Otherwise (NO in S14), it is determined that the accuracy in calculation of estimated oil temperature value THOes has not reached the predetermined level, and the process proceeds to S16.

In S15, ECU 400 sets the change flag stored in storage unit 430 to "ON." In S16, ECU 400 sets the change flag stored in storage unit 430 to "OFF."

FIG. 5 shows a process flow of ECU 400 in the case where one of the first abnormality determination process and the second abnormality determination process is selected based on the change flag set according to the process flow in FIG. 4 to determine whether or not oil temperature sensor 80 is abnormal. The process flow is repeatedly performed in predetermined cycles.

As shown in FIG. 5, in S100, ECU 400 determines whether or not the change flag is "ON." When the change flag is not "ON" (NO in S100), namely the accuracy in calculation of estimated oil temperature value THOes has not reached a predetermined level, the process in S200 to S214 is performed. The process in S200 to S212 corresponds to the above-described first abnormality determination process, and the process in S214 corresponds to the above-described learning about the heat dissipation amount map.

In S200, ECU 400 determines whether or not the cumulative drive time during the present trip exceeds predetermined time t1. In S202, ECU 400 determines whether or not the travel distance during the present trip exceeds a predetermined distance. In S204, ECU 400 determines whether or not the elapsed time after the engine start exceeds predetermined time t2. The process in S200, S202 and S204 is performed for determining whether or not temperature THO of ATF well exceeds predetermined temperature T0. When respective determinations in S200, S202 and S204 are all positive (YES in S200 and YES in S202 and YES in S204), the process proceeds to S206 and the following steps to determine whether or not oil temperature sensor 80 is abnormal. When any of respective determinations in S200, S202 and S204 is negative (NO in S200 or NO in S202 or NO in S204), the determination as to whether or not oil temperature sensor 80 is abnormal is not made and the process is ended.

In S206, ECU 400 detects oil temperature value THOde. In S208, ECU 400 determines whether or not detected oil temperature value THOde exceeds predetermined temperature T0. When the determination is positive (YES in S208), the process proceeds to S212. Otherwise (NO in S208), the process proceeds to S210.

In S210, ECU 400 determines that oil temperature sensor 80 is abnormal. In S212, ECU 400 determines that oil temperature sensor 80 is normal.

In S214, ECU 400 learns about the heat dissipation amount map as described above. Namely, ECU 400 calculates heat dissipation amount Qout based on detected oil temperature value THOde when it is determined that oil temperature sensor 80 is normal in S212. ECU 400 uses the calculated heat dissipation amount Qout as an amount of dissipated heat corresponding to average vehicle speed Vave and average intake air temperature THAave from the time when the present trip is started to the time when it is determined that oil temperature sensor 80 is normal in S212. Since how to learn about the heat dissipation amount map is detailed above, the description thereof will not be repeated here.

Until the change flag is set to "ON," ECU 400 repeats the process in S200 to S214.

In contrast, when the change flag is set to "ON" (YES in S100), namely when the accuracy in calculation of estimated oil temperature value THOes reaches a predetermined level through the repeated learning about the heat dissipation amount map in S214, ECU 400 performs the process in S300 to S308. The process in S300 to S308 corresponds to the above-described second abnormality determination process. Namely, when the change flag is set to "ON," the second abnormality determination process in S300 to S308 is performed instead of the first abnormality determination process in S200 to S212.

In S300, ECU 400 uses the heat dissipation amount map to calculate estimated oil temperature value THOes. Namely, like the process in above-described S12, ECU 400 calculates heat generation amount Q, detects average vehicle speed Vave and average intake air temperature THAave during the present trip, calculates heat dissipation amount Qout corresponding to the result of the detection with reference to the heat dissipation amount map, and calculates estimated oil temperature value THOes based on the difference between heat generation amount Q and heat dissipation amount Qout.

In S302, ECU 400 detects oil temperature value THOde. In S304, ECU 400 determines whether or not difference ΔTHO between detected oil temperature value THOde and estimated oil temperature value THOes continues smaller than a predetermined value for predetermined time t0. When the determination is positive (YES in S304), the process proceeds to S308. Otherwise (NO in S304), the process proceeds to S306.

In S306, ECU 400 determines that oil temperature sensor 80 is abnormal. In S308, ECU 400 determines that oil temperature sensor 80 is normal.

Determination about whether or not oil temperature sensor 80 is abnormal as made by ECU 400 in the present embodiment will be described in conjunction with the above-described structure and flowchart.

<Change Flag is "OFF">

In the initial state, the change flag is set to "OFF." Until the accuracy in calculation of estimated oil temperature value THOes reaches a predetermined level (NO in S14), the change flag is kept "OFF" (NO in S14, S16).

Therefore, in the initial trips, namely several trips or several tens of trips after the vehicle is completed, the change flag is "OFF" (NO in S100), and the first abnormality determination process is used to determine whether or not oil temperature sensor 80 fails (S200 to S212). Namely, after engine 10 is started, when temperature THO of ATF well exceeds predetermined temperature T0 (YES in S200 and YES in S202 and YES in S204), it is determined whether or not oil temperature sensor 80 fails (S208, S210, S212). In other words, in the first abnormality determination process, it is not determined whether or not oil temperature sensor 80 fails until temperature THO of ATF after engine 100 is started well exceeds predetermined temperature T0.

When it is determined in the first abnormality determination process that oil temperature sensor 80 is normal (YES in S208, S212), namely the accuracy in detection of oil temperature value THOde is high, detected oil temperature value THOde is used to learn about the heat dissipation amount map (S214). Thus, only in the case where the accuracy in detection of oil temperature value THOde is high, learning about the heat dissipation amount map is performed using detected oil temperature value, so that erroneous learning about the heat dissipation amount map is appropriately prevented.

Further, the learning about the heat dissipation amount map that is difficult to estimate can improve the accuracy of the heat dissipation amount map (accuracy of the correlation between heat dissipation amount Qout, average vehicle speed Vave and average intake air temperature THAave) according to any change in situation. In the present embodiment, such a heat dissipation amount map is used to calculate estimated oil temperature value THOes (S12), so that the accuracy in calculation of estimated oil temperature value THOes can be improved as well.

Further, the accuracy of the heat dissipation amount map is improved through the learning after the vehicle is completed. Therefore, it is unnecessary to model in advance the correlations between all factors of variation that influence the heat dissipation characteristic of ATF and heat dissipation amount Qout, and the work time required for adaptation is reduced.

Moreover, the temperature sensors necessary for learning about the heat dissipation amount map are existing oil temperature sensor 80 and intake air temperature sensor 118, and any dedicated oil temperature sensor for detecting the ambient temperature of automatic transmission 200 for example is unnecessary.

<Change Flag is "ON">

When the repeated learning about the heat dissipation amount map (S124) causes the accuracy in calculation of estimated oil temperature value THOes to reach a predetermined level (YES in S14), the change flag is changed from "OFF" to "ON" (S15).

When the change flag is changed to "ON" (NO in S100), the second abnormality determination process is used instead of the first abnormality determination process to determine whether or not oil temperature sensor 80 fails in the subsequent trips (S300 to S308). Namely, in the subsequent trips after the accuracy in calculation of estimated oil temperature value THOes reaches a predetermined level, estimated oil temperature value THOes is used as a reference to monitor the divergence of detected oil temperature value THOde relative to estimated oil temperature value THOes and determine whether or not oil temperature sensor 80 fails. Therefore, in the second abnormality determination process, whether or not oil temperature sensor 80 is abnormal can be determined even before ATF exceeds predetermined temperature T0. Therefore, while the accuracy in determination as to whether or not oil temperature sensor 80 fails is ensured, the time for determining whether or not the sensor fails can be shortened and the frequency at which the determination as to whether or not the sensor fails is made can be increased as compared with the first abnormality determination process.

As seen from above, the abnormality determination apparatus for an oil temperature sensor in the present embodiment determines whether or not the oil temperature sensor fails by means of the first determination process with a relatively longer fail determination time. Further, the abnormality determination apparatus learns about the heat dissipation characteristic (amount of dissipated heat) of ATF, using, as parameters, the average outside air temperature and the average vehicle speed at the time when it is determined in the first determination process that the oil temperature sensor is normal. Thus, the heat dissipation characteristic of ATF can be appropriately learned so that the accuracy in estimation of the oil temperature using the heat dissipation characteristic of ATF can be improved, without enormous work time required for adaptation. Further, learning is repeated and, when the accuracy in calculation of the estimated temperature reaches a predetermined level, the process is changed to the second abnormality determination process for determining whether or not the oil temperature sensor fails using the estimated temperature as a reference. Accordingly, the fail determination time can be shortened and the frequency at which the fail determination is made can be increased while appropriately preventing erroneous determination.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An abnormality determination apparatus for an oil temperature sensor used for detecting a temperature of a transmission oil of a transmission for a vehicle, said transmission being used for changing a rotational speed of a drive power source, said abnormality determination apparatus comprising:

said oil temperature sensor;

a first detection unit for detecting a vehicle state amount correlating with heat generation of said transmission;

a second detection unit for detecting a vehicle state amount correlating with heat dissipation of said transmission oil; and a control unit connected to said oil temperature sensor, said first detection unit and said second detection unit, said control unit including:

a first determination unit for performing a first determination process of determining whether or not said oil temperature sensor is abnormal, based on a result of comparison between a detected temperature detected by said oil temperature sensor and a predetermined temperature;

a learning unit for learning about a correlation between a first heat dissipation amount of said transmission oil and said vehicle state amount correlating with heat dissipation when it is determined in said first determination process that said oil temperature sensor is normal, said learning unit calculating, when it is determined in said first determination process that said oil temperature sensor is normal, a heat generation amount of said transmission based on said vehicle state amount correlating with heat generation, and calculating said first heat dissipation amount based on said heat generation amount and said detected temperature; and an estimation unit for estimating a temperature of said transmission oil based on said heat generation amount and a second heat dissipation amount corresponding to said vehicle state amount correlating with heat dissipation, said estimation unit calculating said heat generation amount based on said vehicle state amount correlating with heat generation, and calculating said second heat dissipation amount using a result of learning by said learning unit.

2. The abnormality determination apparatus for an oil temperature sensor according to claim 1, wherein
each time it is determined in said first determination process that said oil temperature sensor is normal, said learning unit learns about the correlation between said first heat dissipation amount and said vehicle state amount correlating with heat dissipation, and stores, in a form of a heat dissipation map, a plurality of correlations between respective said first heat dissipation amounts and respective said vehicle state amounts correlating with heat dissipation obtained each time the learning is performed, and
said estimation unit calculates said second heat dissipation amount with reference to said heat dissipation map.

3. The abnormality determination apparatus for an oil temperature sensor according to claim 1, wherein
said vehicle state amount correlating with heat generation includes at least one of an operational history of said drive power source, an operational history of said transmission and a travel distance of said vehicle, and
said vehicle state amount correlating with heat dissipation includes at least one of a travel speed history of said vehicle and an outside air temperature history of said vehicle.

4. The abnormality determination apparatus for an oil temperature sensor according to claim 1, wherein
said abnormality determination apparatus further includes an accuracy determination unit for determining, based on a difference between said detected temperature and an estimated temperature of said transmission oil estimated by said estimation unit, whether or not an accuracy of said estimated temperature reaches a predetermined target accuracy,
said first determination unit performs said first determination process in a case where the accuracy of said estimated temperature is lower than said predetermined target accuracy, and
said abnormality determination apparatus further includes a second determination unit for performing a second determination process of determining whether or not said oil temperature sensor is abnormal, based on the difference between said estimated temperature and said detected temperature, in a case where the accuracy of said estimated temperature reaches said predetermined target accuracy.

5. The abnormality determination apparatus for an oil temperature sensor according to claim 4, wherein
in a case where the accuracy of said estimated temperature is lower than said predetermined target accuracy, said first determination unit determines whether or not said vehicle state amount correlating with heat generation of said transmission reaches a predetermined amount from which it is predicted that the temperature of said transmission oil increases to a temperature higher than said predetermined temperature, and performs said first determination process after it is determined that said vehicle state amount correlating with heat generation of said transmission reaches said predetermined amount, and
in a case where the accuracy of said estimated temperature reaches said predetermined target accuracy, said second determination unit performs said second determination process, regardless of whether or not said vehicle state amount correlating with heat generation of said transmission reaches said predetermined amount.

6. An abnormality determination method performed by an abnormality determination apparatus for an oil temperature sensor used for detecting a temperature of a transmission oil of a transmission for a vehicle, said transmission being used for changing a rotational speed of a drive power source, said abnormality determination apparatus being connected to said oil temperature sensor, a first detection unit for detecting a vehicle state amount correlating with heat generation of said transmission, and a second detection unit for detecting a vehicle state amount correlating with heat dissipation of said transmission oil, said abnormality determination method comprising the steps of:

performing a first determination process of determining whether or not said oil temperature sensor is abnormal, based on a result of comparison between a detected temperature detected by said oil temperature sensor and a predetermined temperature;

learning about a correlation between a first heat dissipation amount of said transmission oil and said vehicle state amount correlating with heat dissipation when it is determined in said first determination process that said oil temperature sensor is normal, said step of learning including calculating, when it is determined in said first determination process that said oil temperature sensor is normal, a heat generation amount of said transmission based on said vehicle state amount correlating with heat generation, and calculating said first heat dissipation amount based on said heat generation amount and said detected temperature;

estimating a temperature of said transmission oil based on said heat generation amount and a second heat dissipation amount corresponding to said vehicle state amount correlating with heat dissipation, said step of estimating including calculating said heat generation amount based on said vehicle state amount correlating with heat generation, and calculating said second heat dissipation amount using a result of learning in said step of learning;

determining, based on a difference between said detected temperature detected by said oil temperature sensor and an estimated temperature of said transmission oil estimated in said step of estimating the temperature of said transmission oil, whether or not an accuracy of said estimated temperature reaches a predetermined target accuracy; and performing, in a case where the accuracy of said estimated temperature reaches said predetermined target accuracy, a second determination process of determining whether or not said oil temperature sensor is abnormal, instead of said first determination process, based on the difference between said estimated temperature and said detected temperature detected by said oil temperature sensor.

* * * * *